US009888191B2

(12) United States Patent
Beck (10) Patent No.: US 9,888,191 B2
(45) Date of Patent: Feb. 6, 2018

(54) IMAGING SYSTEMS AND METHODS FOR PERFORMING UNBOOSTED IMAGE SENSOR PIXEL CONVERSION GAIN ADJUSTMENTS (71) Applicant: SEMICONDUCTOR COMPONENTS INDUSTRIES, LLC, Phoenix, AZ (US)

(72) Inventor: Jeffery Beck, Corvallis, OR (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 288 days.

(21) Appl. No.: 14/692,512

(22) Filed: Apr. 21, 2015

(65) Prior Publication Data
US 2016/0316163 A1    Oct. 27, 2016

(51) Int. Cl.
H04N 5/335  (2011.01)
H01L 27/00  (2006.01)
H04N 5/355  (2011.01)
H04N 5/243  (2006.01)

(52) U.S. Cl.
CPC ........... *H04N 5/3559* (2013.01); *H04N 5/243* (2013.01)

(58) Field of Classification Search
CPC .... H04N 5/3559; H04N 5/378; H04N 17/002; H04N 5/3698; H04N 5/37213; H04N 5/351
USPC ........................ 250/208.1; 348/300, 294, 308
See application file for complete search history.

(56) References Cited

U.S. PATENT DOCUMENTS

| | | | |
|---|---|---|---|
| 6,627,474 B2 | 9/2003 | Barna et al. |
| 7,075,049 B2 | 7/2006 | Rhodes et al. |
| 7,432,540 B2 | 10/2008 | McKee |
| 7,443,435 B2 | 10/2008 | Loose |
| 7,518,646 B2 | 4/2009 | Zarnowski et al. |
| 8,026,968 B2 | 9/2011 | Pahr |
| 8,077,237 B2 | 12/2011 | Li |
| 8,275,213 B2 | 9/2012 | Richardson |
| 8,299,513 B2 | 10/2012 | Dai |
| 8,729,451 B2 | 5/2014 | Bikumandla |
| 8,730,330 B2 | 5/2014 | Solhusvik et al. |

(Continued)

OTHER PUBLICATIONS

Velichko, U.S. Appl. No. 14/460,966, filed Aug. 15, 2014.
Nakamura et al, U.S. Appl. No. 14/468,242, filed Aug. 25, 2014.

*Primary Examiner* — Xi Wang
(74) *Attorney, Agent, or Firm* — Treyz Law Group, P.C.; Michael H. Lyons; David K. Cole (57) ABSTRACT

An image sensor may include an array of pixels arranged in rows and columns. Each pixel may include a floating diffusion node, a capacitor, a dual conversion gain (DCG) transistor having a gate terminal coupled to the floating diffusion, a source terminal, and a drain terminal coupled to the floating diffusion through the capacitor. Column readout circuitry may provide per-column control signals to the source terminal of the DCG transistor in the pixels of a selected row to place the pixels into a low conversion gain mode by turning the DCG transistor on and into a high conversion gain mode by turning the DCG transistor off. In this way, the readout circuitry may provide per-column conversion gains for each row without boosting DCG control signals to magnitudes greater than the pixel supply voltage, thereby reducing voltage stress on the pixel array and improving lifetime of the image sensor.

20 Claims, 7 Drawing Sheets

(56) References Cited

U.S. PATENT DOCUMENTS

| | | | |
|---|---|---|---|
| 8,748,798 B2 | 6/2014 | Zhang et al. | |
| 2004/0251394 A1* | 12/2004 | Rhodes | H01L 27/14603 250/208.1 |
| 2009/0096890 A1* | 4/2009 | Li | H04N 3/155 348/229.1 |
| 2010/0243866 A1* | 9/2010 | Mo | H03F 3/08 250/214 A |
| 2012/0256077 A1* | 10/2012 | Yen | H01L 27/14609 250/208.1 |

* cited by examiner

IMAGING SYSTEMS AND METHODS FOR PERFORMING UNBOOSTED IMAGE SENSOR PIXEL CONVERSION GAIN ADJUSTMENTS

BACKGROUND

This relates generally to imaging devices, and more particularly, to imaging devices having pixel arrays with per-pixel gain adjustment capabilities.

Image sensors are commonly used in electronic devices such as cellular telephones, cameras, and computers to capture images. In a typical arrangement, an electronic device is provided with an array of image pixels arranged in pixel rows and pixel columns. Row control circuitry is coupled to each pixel row over row control lines for providing pixel control signals to each image pixel in the pixel row. Image pixels are often operated in a low gain mode for capturing images of brighter scenery and in a high gain mode for capturing images of darker scenery.

In conventional imaging systems, row control circuitry provides control signals to each pixel in a selected pixel row that instruct every pixel in that row to operate in either the high gain mode or the low gain mode. However, scenes to be imaged often include both brighter and darker portions across any given row of image pixels. Performing image capture operations using conventional image sensors that control image pixels in an entire pixel row to operate in the high gain or low gain mode may thereby cause some image pixels in a given pixel row to generate excessively noisy or over-saturated image signals, which can generate unsightly image artifacts in the final captured image. During conventional image sensor operation, gain adjustment control signals provided to a row of pixels to place the row into high or low gain modes are typically boosted to voltage levels that are greater than a supply voltage level provided to the row of pixels. However, providing boosted gain adjustment control signals can induce voltage stress on the image sensor and can undesirably limit the lifetime of the image sensor.

It would therefore be desirable to be able to provide imaging devices with improved means of capturing and processing image signals.

DETAILED DESCRIPTION

Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
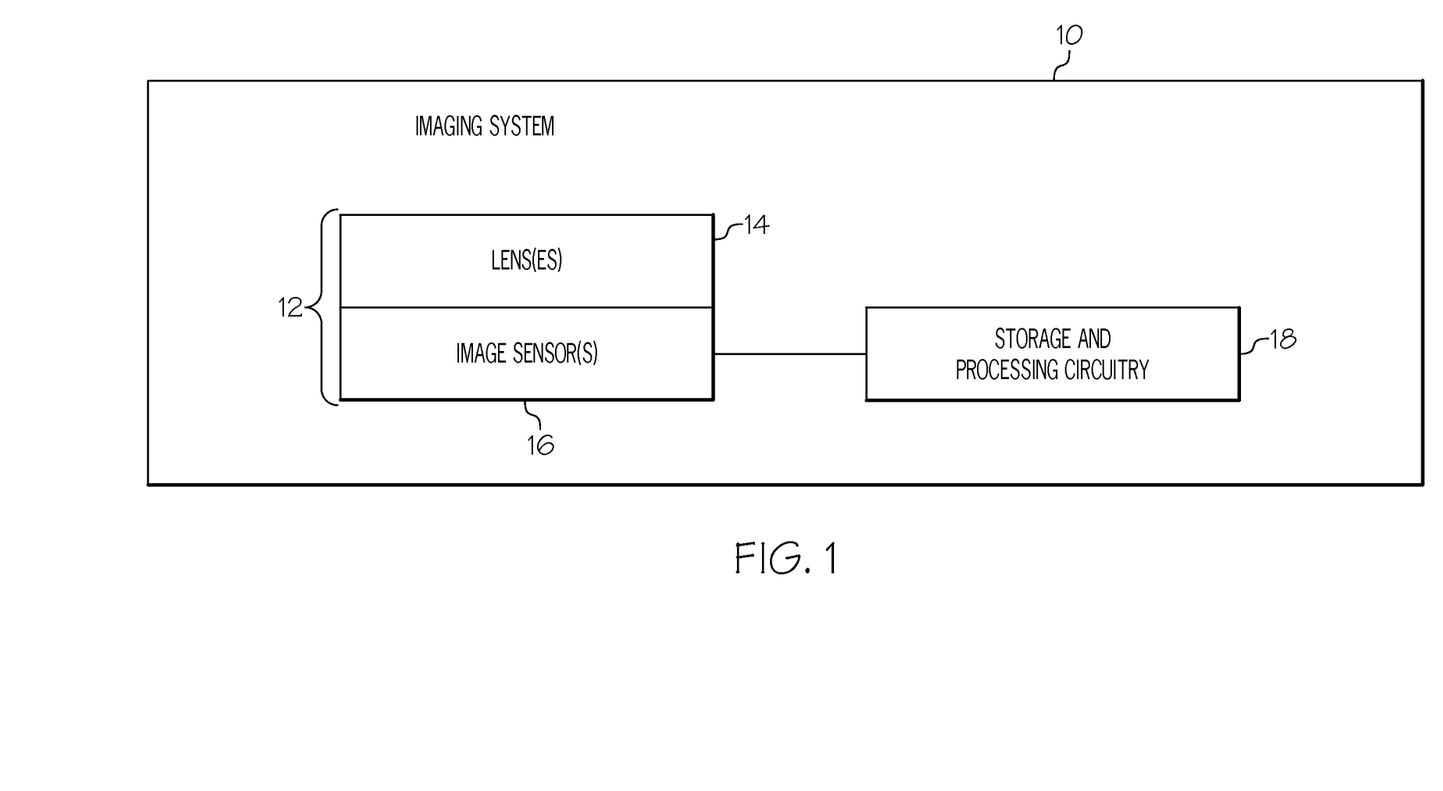
FIG. 1 is a diagram of an illustrative imaging system having an image sensor and processing circuitry for capturing images using column-based pixel gain adjustments in accordance with an embodiment of the present invention.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Figure 2:
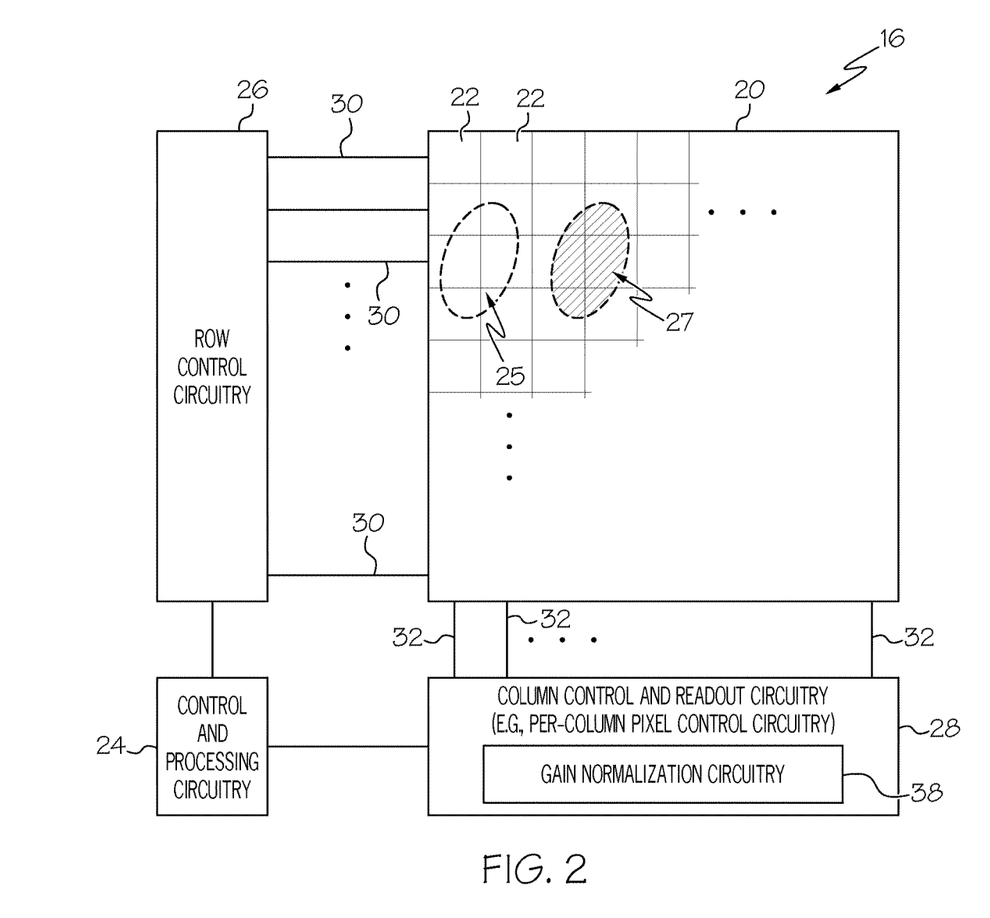
FIG. 2 is a diagram of an illustrative pixel array and associated column control and readout circuitry for controlling per-column gain adjustments in pixels of corresponding pixel columns without boosting control signal voltages in accordance with an embodiment of the present invention.

As shown in FIG. 2, image sensor 16 may include a pixel array 20 containing image sensor pixels 22 arranged in rows and columns (sometimes referred to herein as image pixels or pixels arranged in pixel rows and pixel columns) and control and processing circuitry 24. Array 20 may contain, for example, hundreds or thousands of rows and columns of image sensor pixels 22. Control circuitry 24 may be coupled to row control circuitry 26 and image readout circuitry 28 (sometimes referred to as column control circuitry, readout circuitry, processing circuitry, column decoder circuitry, or column control and readout circuitry). Row control circuitry 26 may receive row addresses from control circuitry 24 and supply corresponding row control signals such as reset, row select, charge transfer, and readout control signals to pixels 22 over row control paths 30. One or more conductive lines such as column lines 32 may be coupled to each column of pixels 22 in array 20. Column lines 32 may be used for reading out image signals from pixels 22, for supplying bias signals (e.g., bias currents or bias voltages), for supplying column-based pixel control signals to pixels 22, or for performing any other desired signal transmissions between column readout circuitry 28 and array 20. If desired, during pixel readout operations, a pixel row in array 20 may be selected using row control circuitry 26 and image signals generated by image pixels 22 in that pixel row can be read out along column lines 32.

Amplifier circuitry (not shown) may, if desired, be interposed on column lines 32 (e.g., each column line 32 may have a corresponding amplifier circuit). Amplifier circuitry in sensor 16 may amplify image signals received from an associated column of pixel array 20 and may provide the amplified image signals to column control and readout circuitry 28. The amplifier circuitry may provide received image signals with a desired gain (e.g., an adjustable gain). For example, amplifier circuitry may provide image signals received from pixels 22 with a relatively high gain (e.g., when the corresponding pixel captures darker portions of a scene) or may provide image signals with a relatively low gain (e.g., when the corresponding pixel captures brighter portions of a scene). Column control and readout circuitry 28 may provide control signals to the amplifier circuitry and to gain adjustment circuitry in pixels 22 to control the gain provided by pixel 22 and the amplifier circuitry to the received image signals.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital conversion (ADC) circuitry, bias circuitry, comparator circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry in readout circuitry 28 may convert analog pixel values received from array 20 into corresponding digital pixel values (sometimes referred to as digital image data or digital pixel data). Image readout circuitry 28 may supply digital pixel data to control and processing circuitry 24 and/or processor 18 (FIG. 1) over path 25 for pixels in one or more pixel columns.

Image pixels 22 may be operated in a low gain mode for capturing images of brighter scenery and in a high gain mode for capturing images of darker scenery. During image capture operations, portions of array 20 may capture image signals from darker portions of an imaged scene whereas other portions of array 20 may capture image signals from brighter portions of the imaged scene. In the example of FIG. 2, pixels 22 in portions 25 of array 20 may capture brighter portions of the imaged scene whereas pixels 22 in portions 27 may capture darker portions of the imaged scene. If desired, different pixels 22 in a given pixel row may be provided with respective control signals via corresponding control lines 32 that instruct the pixels to operate with a desired gain (e.g., in either a high or low gain mode). For example, pixels 22 located in brighter region 25 of a given row of array 20 may be provided with control signals via control lines 32 that instruct those pixels to operate in a low gain mode (e.g., to prevent over-saturation of the image pixels), whereas pixels 22 located in darker region 25 of the given row of array 20 may be provided with control signals via control lines 32 that instruct those pixels to operate in a high gain mode (e.g., to improve signal-to-noise ratio in the image signals captured by those pixels).

If desired, image readout circuitry 28 may include image signal linearization circuitry such as gain normalization circuitry 33. Normalization circuitry 33 may normalize or linearize the gain of image signals read out from array 20. For example, readout circuitry 28 may identify whether each pixel that is read out was read out in a high or low gain mode and can provide information about the gain mode used for each pixel to normalization circuitry 33. Normalization circuitry 33 may normalize the readout image signals based on the identified gain mode (e.g., so that any extra gain applied to a particular pixel may be compensated for, etc.). For example, an additional digital bit may be sent to normalization circuitry 33 when analog to digital conversion is performed by ADC circuitry in readout circuitry 28 to inform normalization circuitry 33 of the gain mode used for each pixel.

If desired, column readout and control circuitry 28 may include per-column control circuits (not shown for the sake of clarity) that are each coupled to a respective column path 32. The column control circuits may include readout circuitry (e.g., sample and hold circuitry, converter circuitry, etc.) for reading out signals from the corresponding column of pixels 22 and may include control circuitry for providing control signals to the corresponding column of pixels 22 (e.g., a given column control circuit may only readout and provide control signals to pixels in a corresponding column without reading out or controlling pixels in other columns of array). The control circuits may provide respective control signals to the corresponding column of pixels 22 that instruct the pixels in that column to operate with a desired gain. For example, a first control circuit coupled to a first column line 32 may instruct pixels 22 in a first column of a selected row of array 20 to capture signals in a low gain mode whereas a second control circuit coupled to a second column line 32 may instruct pixels 22 in a second column of the selected row of array 20 to capture signals in a high gain mode. Control circuits 31 may control the gain of a given column of pixels 22 by, for example, adjusting the gain provided by the amplifier circuit in that column and/or by adjusting gain control signals provided to the pixels 22 over lines 32. Gain control signals provided to pixels 22 over lines 32 may include, for example, dual conversion gain (DCG) control signals that are configured to adjust the charge storage capacity of a given pixel 22.

If desired, per-column control circuits in readout circuitry 28 may each include image signal processing circuitry that processes signals that are read out from the corresponding column of pixels 22. Processing circuitry in the column control circuits may include analog comparator circuitry, digital comparison logic circuitry, or other processing circuitry for processing image signals. Image processing circuitry in the per-column control circuits may process signals read out from pixels 22 to determine whether the gain used by pixels 22 in the corresponding column needs to be adjusted. If the processing circuit determines that the gain needs to be adjusted, the circuit may provide control signals to pixels 22 in the corresponding column that adjust the gain used by the pixel to capture image signals. In this way, gain selection and adjustments used by pixels 22 for capturing image signals may be actively adjusted for each pixel 22 across a given row of pixel array 20, allowing for a single row to capture signals using both low gain and high gain modes (e.g., based on whether certain pixels in that row are located in bright portions 25 or dark portions 27 of the imaged scene).

Figure 3:
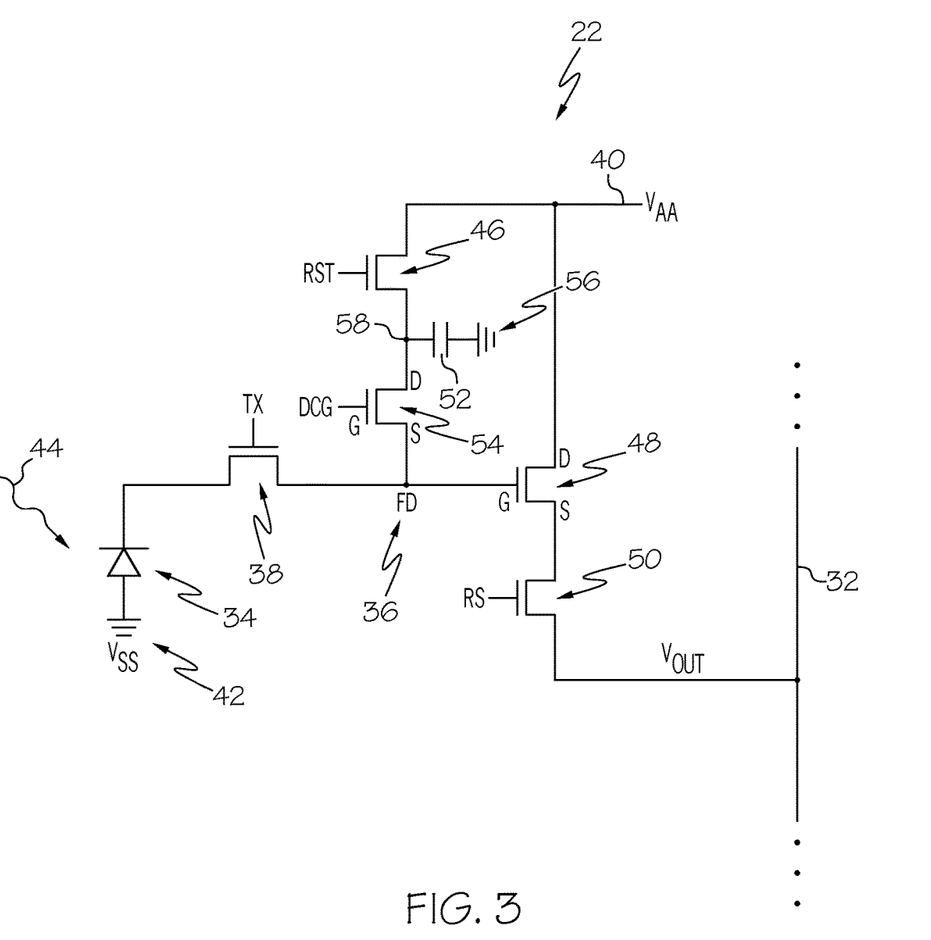
FIG. 3 is a circuit diagram of an illustrative image sensor pixel having a dual conversion gain transistor for capturing and outputting image signals using selected pixel conversion gains in accordance with an embodiment of the present invention.

FIG. 3 is a circuit diagram of one possible arrangement for image sensor pixel 22 that is coupled to column control and readout circuitry 28 for performing gain adjustment operations. As shown in FIG. 3, pixel 22 may be coupled to readout circuitry 28 via a corresponding column path 32. Pixel 22 may include any desired number of photosensitive regions for capturing image charge. In the example of FIG. 3, pixel 22 includes a photosensitive region (photodiode) 34 coupled to a charge storage node 36 via charge transfer gate 38. Photodiode 34 may, if desired, be provided with a corresponding color filter element for capturing light of a desired color. Pixel 22 may receive row control signals (e.g., reset control signals RST, charge transfer control signals TX, and row select control signals RS) from row control circuitry 26 via row control lines 30 (FIG. 2).

A positive power supply voltage (e.g., voltage Vaa or another reset-level voltage) may be supplied at positive power supply terminal 40 (e.g., from column control circuits 31 or other power supply circuitry). A ground power supply voltage (e.g., Vss) may be supplied at ground terminal 42. Incoming light 44 may be collected by photodiode 34. Photodiodes 34 convert the incoming light into electrical charge.

If desired, row control circuitry 26 (as shown in FIG. 2) may assert reset control signal RST before an image is acquired. This turns on reset transistor 46 and resets charge storage node 36 to Vaa or another reset-level voltage. Charge storage node 36 may sometimes be referred to herein as floating diffusion node FD or floating diffusion region FD. Charge storage nodes 36 may be implemented using a region of doped semiconductor (e.g., a doped silicon region formed in a silicon substrate by ion implantation, impurity diffusion, or other doping techniques). The doped semiconductor region (i.e., the floating diffusion FD) exhibits a capacitance that can be used to store the charge that has been transferred from photodiode 34 (e.g., regions 36 may have a corresponding charge capacity indicative of the amount of charge that can be stored at region 36). The signal associated with the stored charge on node 36 is conveyed to row select transistor 50 by source-follower transistor 48.

Photodiode 34 in pixel 22 may be coupled to charge storage region 36 through charge transfer gate 38. Row control circuitry 26 may provide corresponding charge transfer control signals TX to the gate terminal of charge transfer gate 38 to control gate 38. The reset control signal RST may be deasserted to turn off reset transistor 46 (e.g., for pixels 22 across the corresponding row of array 20). After the reset process is complete, transfer gate control signals TX may be asserted to turn on transfer gate 38. When transfer transistor 38 is turned on, the charge that has been generated by the corresponding photodiode 34 in response to incoming light is transferred to charge storage node 36. When it is desired to read out the value of the stored charge (i.e., the value of the stored charge that is represented by the signal at the source S of transistor 48), row select control signal RS may be asserted (e.g., concurrently for all pixels in the selected row). When signal RS is asserted, transistor 50 turns on and a corresponding image signal $V_{OUT}$ that is representative of the magnitude of the charge on the corresponding charge storage node 54 (e.g., a reset-level or an image-level voltage) is produced on column output path 32. In a typical configuration, there are numerous rows and columns of image pixels such as image pixel 22 in image pixel array 20. When row select control signal RS is asserted in a given row, a path such as column line 32 may be used to route signal $V_{OUT}$ from that image pixel to the per-column control and readout circuit in column circuitry 28 associated with that column of array 20. If desired, reset-levels and image-levels may be sampled, held, and converted for each image pixel 22 to allow for kTC reset noise compensation via a correlated double sampling technique, for example.

Pixels 22 may be provided with gain selection circuitry that enhances the dynamic range of the images produced by image sensor 16. For example, each pixel 22 may generate a corresponding image signal using a selected gain setting (mode). In some configurations, a selected gain setting may depend on the amount of light captured by the pixel during an exposure (i.e., an integration period between resets of the pixel during which a photosensitive element generates charges in response to incoming light). In other configurations, the gain may be kept at a constant setting. As shown in FIG. 3, image pixels 22 may include capacitor 52 and transistor 54 coupled in series between terminal 56 and floating diffusion nodes 36. The source terminal S of transistor 54 may be coupled to floating diffusion node 36 whereas the drain terminal D may be coupled to capacitor 52 and reset gate 46 (e.g., at node 58). In one suitable arrangement, terminal 56 may be coupled to positive power supply voltage Vaa. In another suitable arrangement, terminal 56 may be coupled to ground power supply Vss.

Transistor 54 may have a gate terminal G that is controlled using dual conversion gain control signal DCG. Pixel 22 may receive dual conversion gain control signals DCG over the corresponding column line 32 from column readout circuitry 28 (e.g., pixel 22 may receive dual conversion gain signal DCG over column lines 32 from a corresponding per column control circuit within circuitry 28). Pixel 22 may be operable in a high conversion gain mode (high gain mode) and in a low conversion gain mode (low gain mode). If transistor 54 is disabled (e.g., if signal DCG is low), the corresponding pixel 22 is placed in the high conversion gain mode. If transistor 54 is enabled (e.g., if signal DCG is high), the corresponding pixel 22 is placed in the low conversion gain mode.

In general, pixel conversion gain is inversely proportional to the amount of loading capacitance at node FD. When transistor 54 is turned on, capacitor 52 is switched into use in order to provide floating diffusion node 36 with additional capacitance (e.g., additional charge storage capacity). This results in a lower conversion gain for pixel 22. When transistor 54 is turned off, the additional loading of capacitor 52 is removed and pixel 22 reverts to a relatively higher pixel conversion gain configuration. Per-column control circuits in readout circuitry 28 may independently adjust dual conversion gain control signal DCG provided to pixels 22 across a selected row while the row select signal RS is asserted for all of the pixels in that row (e.g., control signal DCG may be pulsed high or low without deasserting row select signal RS). In this way, per-column control circuits may individually adjust the conversion gain provided for each pixel 22 in a given row of array 20 during image capture and readout operations.

During operation of image sensor pixels having a dual gain conversion transistor 54 that receives control signal DCG at the corresponding gate terminal, a relatively high voltage magnitude for control signal DCG (e.g., a magnitude greater than supply voltage Vaa) is required to turn on DCG gate 54 and to maintain DCG gate 54 in the on state (e.g., because the source terminal S of gate 54 is coupled to floating diffusion node 36 and a gate-to-source voltage of 1-2V for DCG gate 54 is typically needed to turn the transistor on). For example, the magnitude of control signal DCG may need to be as high as 1-2V greater than the magnitude of supply voltage Vaa (e.g., because the source terminal is coupled to floating diffusion node 36) in order for DCG transistor 54 to be satisfactorily turned on during image sensor operation. In order to provide sufficiently high voltage magnitudes for control signal DCG to turn on gate 54, circuitry 28 may provide control signal DCG with a so-called "voltage boost" to increase the magnitude of signal DCG to a level that is sufficiently greater than supply voltage Vaa. However, using boosted voltages such as those required to turn on gate 54 may impose undesirable voltage stress on the semiconductor substrate in which pixel 22 is formed, diminishing performance of pixel 22 over time and reducing the overall effective lifetime of the pixel. It may therefore be desirable to be able to image pixels 22 with improved conversion gain adjustment capabilities.

Figure 4:
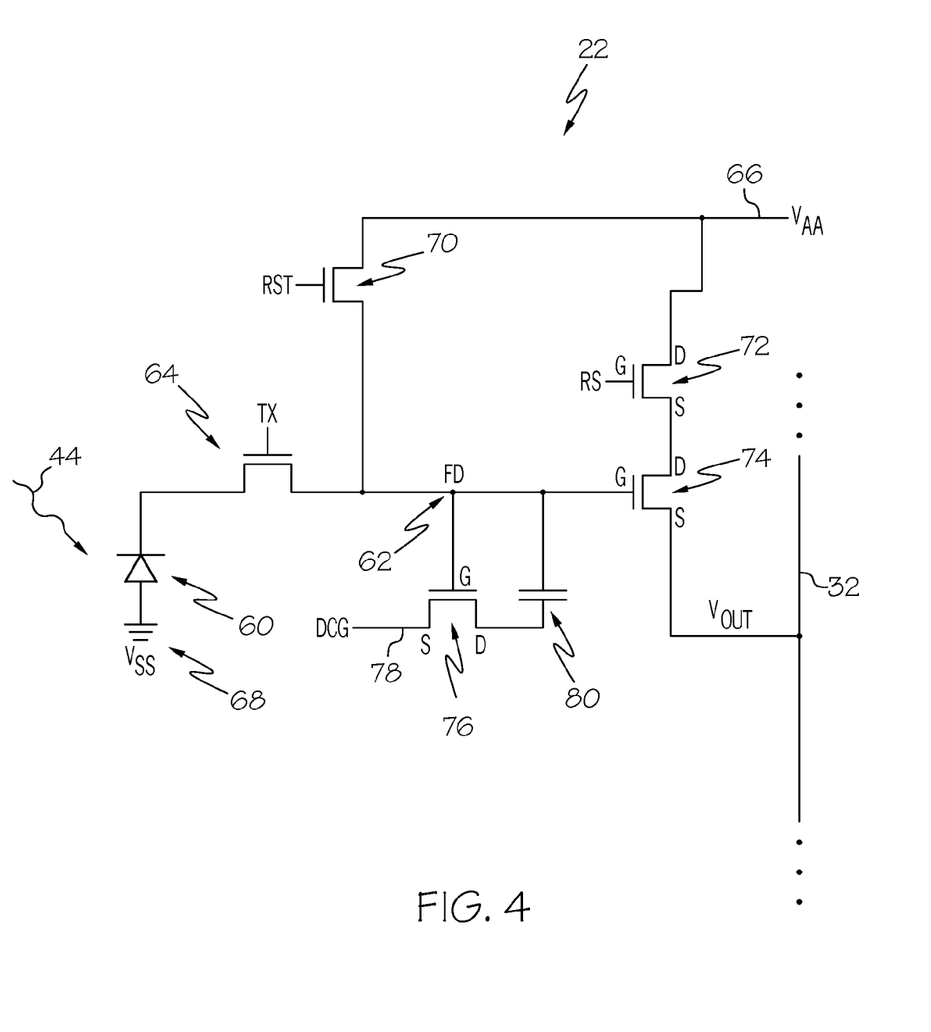
FIG. 4 is a circuit diagram of an illustrative image sensor pixel having a dual conversion gain transistor with a source terminal that receives un-boosted per-column gain control signals for capturing and outputting image signals using selected pixel conversion gains in accordance with an embodiment of the present invention.

FIG. 4 is a circuit diagram of another possible arrangement for illustrative image sensor pixels 22 in which the gain mode of pixel 22 is adjusted without using boosted DCG control signal voltages. As shown in FIG. 4, pixel 22 may include a photosensitive region such as photodiode 60 coupled to charge storage node 62 via charge transfer gate 64. Positive power supply voltage Vaa (or any other desired reset-level voltage) may be supplied at positive power supply terminal 66 whereas ground power supply voltage Vss may be supplied at ground terminal 68.

Incoming light 44 may be collected by photodiode 60. Photodiode 60 may convert the incoming light into electrical charge. Reset transistor 70 may be coupled between floating diffusion node 62 and power supply terminal 66. Source follower transistor 74 may be coupled between floating diffusion node 62 and column readout line 32 (e.g., the gate terminal of transistor 74 may be coupled to node 62 whereas the source terminal of transistor 74 may be coupled to column output path 32). Row select transistor 72 may be coupled between power supply terminal 66 and source follower transistor 74 (e.g., the source terminal of row select transistor 72 may be coupled to the drain terminal of source follower transistor 74, whereas the drain terminal of row select transistor is coupled to power supply terminal 66). Reset control signal RST may be asserted to the gate terminal of reset transistor 70 to turn on transistor 70 and to reset floating diffusion node 62 to voltage Vaa before an image is acquired. The reset-level signal associated with the stored charge on node 62 is conveyed to column line 32 by source-follower transistor 74 when row select signal RS is asserted to the gate terminal of row select transistor 72.

Reset control signal RST may be deasserted to turn off reset transistor 70 (e.g., for pixels 22 across the corresponding row of array 20). After the reset process is complete, transfer gate control signal TX may be asserted to turn on transfer gate 64. When transfer transistor 64 is turned on, the charge that has been generated by photodiode 60 in response to incoming light is transferred to charge storage node 62. When it is desired to read out the value of the stored charge, row select control signal RS may be asserted (e.g., concurrently for all pixels in the selected row). When signal RS is asserted, transistor 72 turns on and a corresponding image signal $V_{OUT}$ that is representative of the magnitude of the charge on the corresponding charge storage node 62 (e.g., an image-level voltage) is produced on column output path 32. If desired, reset-levels and image-levels may be sampled, held, and converted for each image pixel 22 to allow for kTC reset noise compensation via a correlated double sampling technique, for example.

Pixel 22 may be provided with gain selection circuitry that enhances the dynamic range of the images produced by image sensor 16 without requiring a boosted DCG control signal. As shown in FIG. 4, image pixel 22 may include a capacitor 80 coupled in series with the channel of dual conversion gain transistor 76 between terminal 78 and floating diffusion node 62. Terminal 78 may be coupled to a corresponding column control line 32. The gate of dual conversion gain transistor 76 may be coupled to floating diffusion node 62. Capacitor 80 may be coupled between the drain terminal D of dual conversion gain transistor 76 and floating diffusion node 62. The source terminal S of dual conversion gain transistor 76 may receive dual conversion gain control signal DCG from image readout and control circuitry 28 (e.g., over column path 32). Control signals DCG may be provided by control circuitry 28 to control the gain of pixel 22. In the arrangement of FIG. 3, the dual conversion gain transistor 54 in each image pixel is controlled by control signals DCG provided to the gate terminal of the dual conversion gain transistor, whereas in the arrangement of FIG. 4, the dual conversion gain transistor 76 in each image pixel is controlled by control signals DCG provided to the source terminal of the dual conversion gain transistor.

Dual conversion gain transistor 76 may be turned on (enabled) to extend the charge storage capacity of floating diffusion node 62 to also include the charge storage capacity of capacitor 62 (e.g., to place the pixel in the low conversion gain mode). When dual conversion gain transistor 76 is turned off (disabled), the charge storage capacity of floating diffusion node 62 does not include the charge storage capacity associated with capacitor 80 (e.g., to place the pixel in the high conversion gain mode). In the arrangement shown in FIG. 4, when the magnitude of control signal DCG provided to source terminal S of DCG transistor 76 is pulled to a sufficiently low level such as ground (e.g., level Vss), there may be a sufficient voltage difference between floating diffusion node 62 (i.e., gate terminal G of transistor 76) and source terminal S of transistor 76 such that transistor 76 is turned on, thereby enabling extension of the capacity of pixel 22 to include capacitor 80 and placing pixel 22 in the low conversion gain mode. In general, DCG transistor 76 may be turned on whenever the magnitude of control signal DCG provided to source terminal S is less than the voltage level of floating diffusion node 62 by a predetermined threshold value (e.g., when the magnitude of control signal DCG is more than 0.6 V less than the voltage level of node 62 such as when DCG is at level Vss).

When the magnitude of control signal DCG provided to source terminal S of transistor 76 is provided at supply level Vaa, transistor 76 is biased such that transistor 76 is turned off, thereby disabling capacitor 80 from contributing to the charge storage capacity of the pixel and placing pixel 22 in the high conversion gain mode. In general, DCG transistor 76 may be turned off whenever the magnitude of control signal DCG is greater than the voltage level of floating diffusion node 62 minus the predetermined threshold value (e.g., DCG transistor 76 is turned off when the magnitude of control signal DCG is greater than 0.6V less than the voltage level of node 62 such as when the magnitude of signal DCG is at Vaa, when the magnitude of control signal DCG is equal to the voltage level of node 62, when the magnitude of control signal DCG is greater than the voltage level of node 62, etc.).

In other words, the arrangement of pixel 22 allows for DCG transistor 76 to be turned on or off and maintained in an on or off state by providing DCG control signals having magnitudes ranging between ground level Vss and supply level Vaa. In this way, pixel 22 may be adjusted between high and low conversion gain modes without providing DCG control signals with voltages greater than supply level Vaa (e.g., without performing voltage boosting for the DCG control signals), thereby reducing voltage stress on pixels 22 and increasing the lifetime of image sensor 16 relative to scenarios where boosted voltages are used. In addition, the arrangement of FIG. 4 in which DCG capacitor 80 is connected to ground when in use (e.g., because ground level Vss turns on DCG transistor 76) causes any noise that is generated by gate 76 to be generated in a common mode with noise generated by photodiode 60 (e.g., since photodiode 60 is also referenced to ground Vss), thereby reducing overall noise injection into the final image signal.

The example of FIG. 4 is merely illustrative. In general, pixel 22 may include any desired number of photosensitive regions 60 (e.g., one photodiode 60, three photodiodes 60, four photodiodes 60, etc.) coupled to a corresponding charge storage node 62 (e.g., via corresponding charge transfer gates). If desired, multiple DCG gates 76 may be coupled to storage region 62 for coupling storage region 62 to multiple additional storage capacitances 80 (e.g., to allow for more finely tuned adjustment of the storage capacity in the pixel). In general, each pixel 22 may include any desired number of photosensitive regions coupled to a charge storage region by corresponding charge transfer gates and may include one or more additional capacitances coupled to the charge storage region by one or more corresponding DCG gates that are controlled by a corresponding per-column control circuit in readout circuitry 28.

If desired, column control circuitry 28 may read out image signals from pixels 22 and may process the image signals read out from the pixels to determine whether the pixel conversion gain needs to be adjusted in each column. For example, each per-column control circuit in circuitry 28 may process image signals of a corresponding pixel in a selected pixel row (e.g., a pixel row to which row select signal RS is asserted) to determine whether that pixel needs to adjust conversion gain regardless of the conversion gain used by the other pixels in the selected pixel row.

Figure 5:
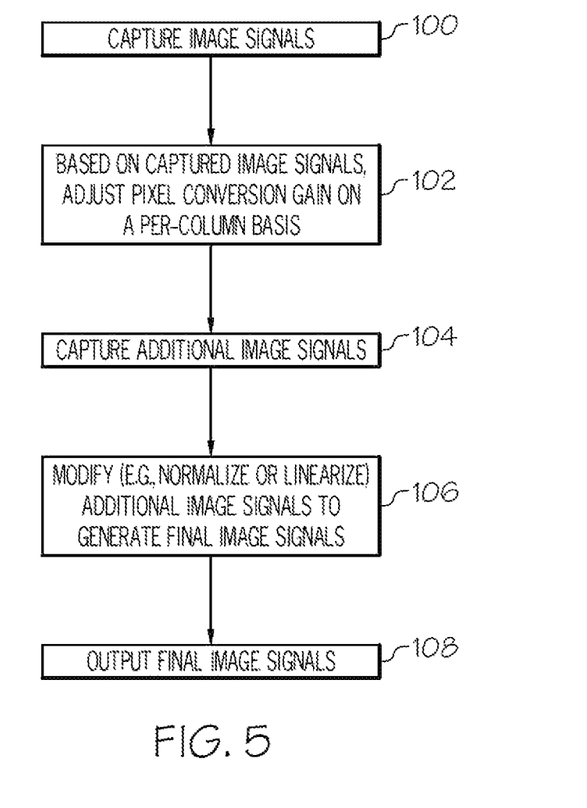
FIG. 5 is a flow chart of illustrative steps that may be performed by an image sensor of the type shown in FIGS. 1-4 to adjust the conversion gain of a corresponding pixel in response to image signals captured by that pixel in accordance with an embodiment of the present invention.

FIG. 5 is a flow chart of illustrative steps that may be performed by image sensor 16 to operate an array 20 of image sensor pixels 22 of the type shown in FIG. 4 having gain modes that are adjustable without providing boosted control signals. The steps of FIG. 5 may be performed to adjust the conversion gain mode of a particular pixel based on image signals captured by that pixel, for example.

At step 100, image sensor pixels 22 in array 20 may capture image signals. Image sensor pixels 22 may capture image-level signals and/or reset level signals. The image signals may be provided to column readout circuitry 28.

At step 102, column readout circuitry 28 may process the received pixel signals to determine whether pixel conversion gain needs to be adjusted on a per-column basis (e.g., for each pixel in a given row). For example, column readout circuitry 28 may receive image signals from pixels in a given (e.g., selected) row of array 20. Circuitry 28 may process the image signals generated by each pixel in the selected row to determine whether conversion gain needs to be adjusted for that pixel and to perform any desired conversion gain adjustments based on the determination. For example, circuitry 28 may determine whether a given pixel is in a relatively dark portion 27 (FIG. 2) of array 20 or a relatively light portion 25 of array 20 (e.g., based on the brightness of the corresponding image signal) and may turn DCG transistor 76 on or off for each pixel 22 of the selected row based on the determination (e.g., circuitry 28 may provide signal DCG at a relatively low voltage such as level Vss to turn on DCG transistor 76 when it is determined that the corresponding pixel 22 is in a relatively dark region 27 of the frame, whereas circuitry 28 may provide signal DCG at a relatively high voltage such as level Vaa to turn off DCG transistor 76 when it is determined that the corresponding pixel 22 is in a relatively light region 25 of the frame). Each pixel in the selected row may be operated in a corresponding gain mode (e.g., circuitry 28 may adjust the conversion gain transistor in each pixel 22 of the selected row on a per-column basis). In this way, different pixels in each row of array 20 may be operated in different conversion gain modes based on image signals captured by that row of array 20.

At step 104, image sensor pixels 22 in array 20 may capture additional image signals using the current conversion gain settings that were adjusted while processing step 102. Image sensor pixels 22 may provide the additional image signals to circuitry 28 for processing. The additional image signals may be captured and read out with optimized gain settings on a per-column basis (e.g., without over saturating the image signals from pixels in bright regions 25 and without excessive noise in image signals from pixels in dark regions 27) due to the gain adjustments performed at step 102. The additional image signals may, if desired, be provided to normalization circuitry 38 of FIG. 2. If desired, step 104 may be omitted if it is determined that no adjustments are to be made while processing step 102.

At step 106, normalization circuitry 38 may normalize (linearize) the additional image signals to generate final image signals.

At step 108, the final image signals may be output to control and processing circuitry 24 (FIG. 2) and/or any other desired internal or external image processing circuitry. If desired, the gain mode of pixels 22 may be adjusted on a per-row and per-column basis to perform high-dynamic-range (HDR) imaging in which alternating rows or pairs of rows of pixels 22 generate long and short exposure image signals. The final output image may, for example, be an HDR image generated by combining the rows of long and short exposure image signals. If desired, the conversion gain mode of different rows of pixels may be adjusted to generate long and short effective exposure image signals that are read out in a single readout sequence and combined to generate an HDR final image.

Figure 6:
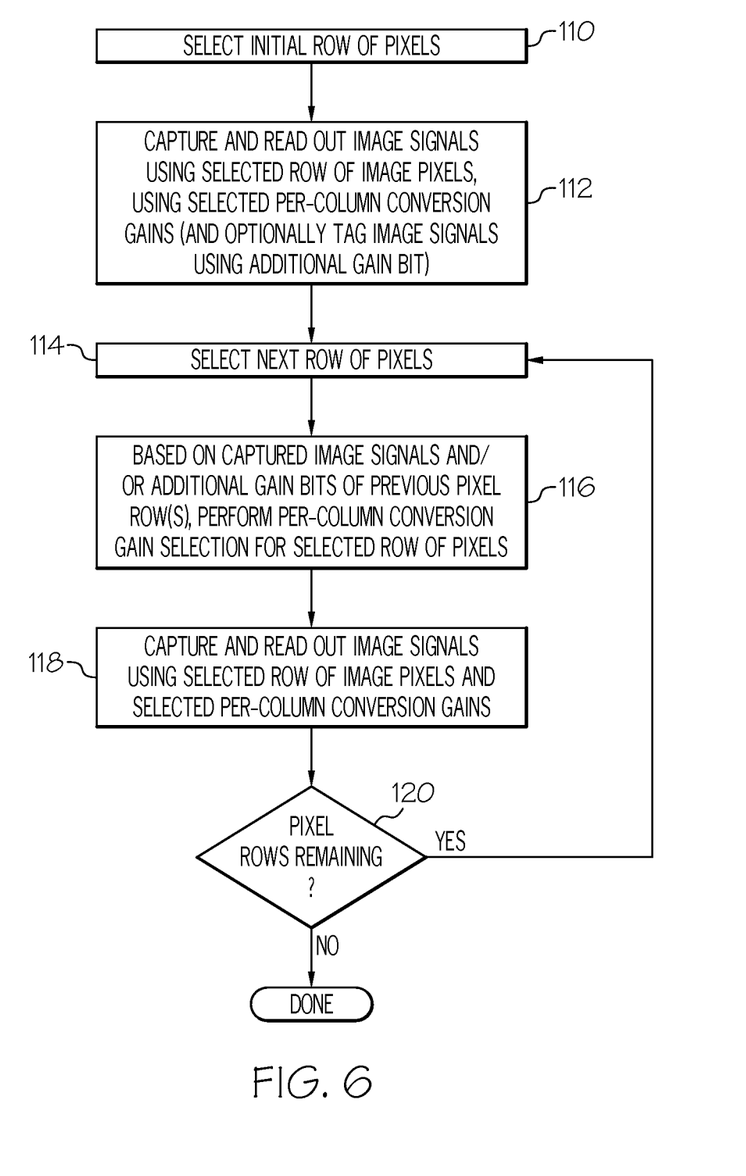
FIG. 6 is a flow chart of illustrative steps that may be performed by an image sensor of the type shown in FIGS. 1-4 to adjust the conversion gain of a corresponding pixel in response to image signals captured by pixels in previous rows of the array and in the same column as that pixel in accordance with an embodiment of the present invention.

If desired, image signals captured by previous rows of image pixels in array 20 may be used to select a desired per-column gain mode for pixels in subsequent rows of array 20 (e.g., so that two signal capture and readout operations need not be performed for any given row of array 20). FIG. 6 is a flow chart of illustrative steps that may be performed by image sensor 16 to determine a gain mode for different rows of pixels 22 in array 20 based on previously captured rows of image data. At step 110, row control circuitry 26 may select an initial row of pixels 22 in array 20. For example, row control circuitry 26 may select the first row of pixels 22 in array 20 or any other desired row of pixels.

At step 112, image sensor pixels 22 in the selected row of array 20 may capture and read out image signals using desired per-column conversion gain settings (e.g., such that a predetermined number of pixels 22 in the selected row capture image signals with DCG gate 76 turned off and a predetermined number of pixels 22 in the selected row capture image signals with DCG gate 76 turned on). If desired, the read out image signals may be tagged with metadata or an additional gain bit (e.g., after converting the analog image signals to digital pixel data) that identifies the conversion gain mode used by each pixel in the selected row to capture the image signals. The captured image signals and/or the metadata may be used to determine the desired gain mode for subsequent rows of pixels in array 20.

At step 114, row control circuitry 26 may select the subsequent row of pixels in array 20 for processing. For example, if the fifth row of pixels 22 is selected at step 110, circuitry 26 may select the sixth row of pixels 22 in array 20, if the first row of pixels 22 is selected at step 110, circuitry 26 may select the second row of pixels 22 in array 20, etc. If desired, processing circuitry 28 may use image data captured by the previously selected row of pixels 22 (e.g., the immediately adjacent previous row of pixels) in array 20 to determine the desired gain settings of subsequent rows of pixels 22.

At step 116, control circuitry 26 may capture and read out image data from the selected subsequent row (e.g., as selected at step 114) using a selected gain mode based on the image data read and/or the metadata (additional bit) added to the image data for the previous row of image data (e.g., the row selected at step 110). The desired gain mode for the subsequent selected row may be selected based on the image signals and/or metadata captured for the pixel 22 in each corresponding column of the previously selected pixel row (e.g., a column-wise gain selection may be performed). For example, if the image data captured for a given column of the previous row of pixels has metadata or an additional bit indicating that a high conversion gain mode was used for that column in the previous row of the array, processing circuitry 28 may determine that the selected subsequent row of array 20 should also be operated in high conversion gain mode for that column. If the image data captured for the given column of the previous row of pixels has metadata or an additional bit indicating that a low conversion gain mode was used for that column in the previous row of the array, processing circuitry 28 may determine that the selected subsequent row of array 20 should also be operated in low conversion gain mode for that column.

As another example, circuitry 28 may process the image data captured by the previous row of pixels on a per-column basis. For example, if a pixel value captured for a given column in the previous row of array 20 is saturated (e.g., excessively bright), circuitry 28 may determine that the pixel 22 in that column of the selected subsequent row of pixels should be adjusted to operate in a low conversion gain mode to prevent saturation in the selected subsequent row of pixels. If a pixel value captured for the given column is excessively noisy, circuitry 28 may determine that pixel 22 in that column of the selected subsequent row should be operated in a high conversion gain mode to improve the signal to noise ratio in the selected subsequent row of pixels. In this way, the gain mode for each pixel in each row may be actively adjusted based on image data captured in one or more previous rows of array 20. By performing each gain determination on a per column basis, each row may be operated in both the high and low conversion modes for different pixels in that row (e.g., thereby accommodating scenes in which a single row includes both bright and dark portions). By controlling the gain mode of pixels 22 without boosting signal DCG, image sensor 16 may perform imaging operations without inducing voltage stress on the image sensor substrate. This example is merely illustrative and does not serve to limit the scope of the present invention. In general, any desired method may be used to determine whether a particular pixel in a selected row of array 20 should be operated in high or low conversion gain modes.

At step 118, the selected subsequent row of array 20 may capture and read out image signals using the selected per-column conversion gains (e.g., as selected for each pixel in the row while processing step 116). In this way, the selected subsequent row of pixels may capture data having a conversion gain appropriate for the image being captured. At step 120, image sensor 16 may determine whether pixel rows remain for processing and, if pixel rows remain for processing, processing may loop back to step 114 to continue to capture and readout image signals from array 20. Once the array has captured image signals for each row (e.g., if no pixel rows remain), processing may end and a final image frame from the entire array 20 may be output.

Figure 7:
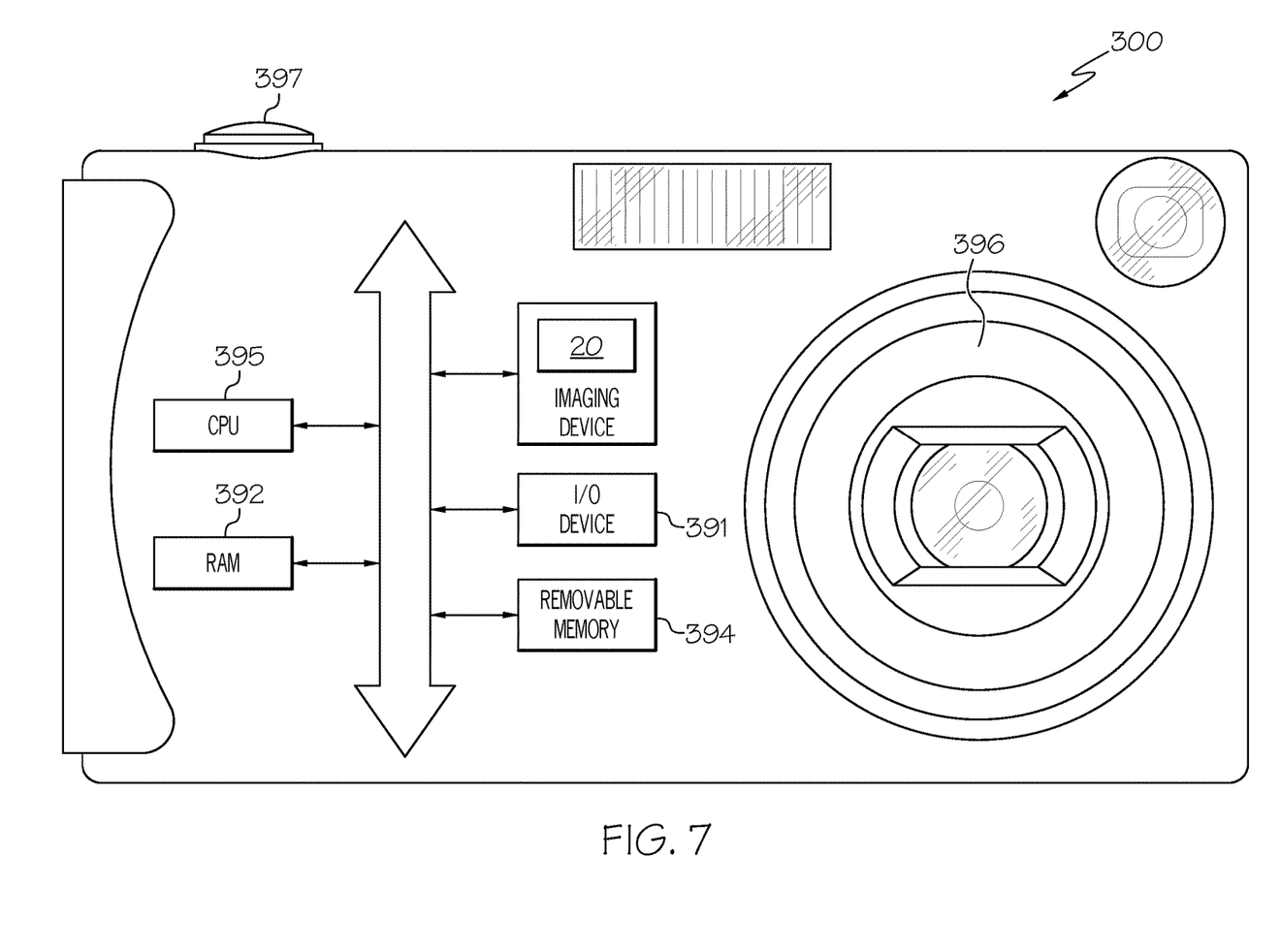
FIG. 7 is a block diagram of a processor system employing the embodiments of FIGS. 1-6 in accordance with an embodiment of the present invention.

FIG. 7 shows in simplified form a typical processor system 300, such as a digital camera, which includes an imaging device 200 (e.g., an imaging device 200 such as device 10 of FIGS. 1-6 and the techniques for capturing images using per-pixel gain adjustments without boosting control signal voltages). The processor system 300 is exemplary of a system having digital circuits that could include imaging device 200. Without being limiting, such a system could include a computer system, still or video camera system, scanner, machine vision, vehicle navigation, video phone, surveillance system, auto focus system, star tracker system, motion detection system, image stabilization system, and other systems employing an imaging device.

The processor system 300 generally includes a lens 396 for focusing an image on pixel array 20 of device 200 when a shutter release button 397 is pressed, central processing unit (CPU) 395, such as a microprocessor which controls camera and one or more image flow functions, which communicates with one or more input/output (I/O) devices 391 over a bus 393. Imaging device 200 also communicates with the CPU 395 over bus 393. The system 300 also includes random access memory (RAM) 392 and can include removable memory 394, such as flash memory, which also communicates with CPU 395 over the bus 393. Imaging device 200 may be combined with the CPU, with or without memory storage on a single integrated circuit or on a different chip. Although bus 393 is illustrated as a single bus, it may be one or more busses or bridges or other communication paths used to interconnect the system components.

Various embodiments have been described illustrating systems and methods for generating images using an image sensor pixel array having per-pixel gain adjustment capabilities without boosting pixel control signal voltages to magnitudes greater than the supply voltage of the pixel.

An imaging system may include an array of image sensor pixels arranged in rows and columns, row control circuitry coupled to the array via multiple row control lines, and readout circuitry coupled to the array via multiple column lines. The array may include any desired number of image pixels. Each image sensor pixel may include a charge storage region (e.g., a floating diffusion region or node), a dual conversion gain transistor having a gate terminal coupled to the charge storage region, a source terminal, and a drain terminal, and a capacitor coupled between the drain terminal of the dual conversion gain transistor and the charge storage region. The dual conversion gain transistor may be configured to place the image sensor pixel into a low conversion gain mode when the dual conversion gain transistor is turned on (e.g., enabling the charge storage capacity of the capacitor to contribute to the charge storage capacity of the floating diffusion region) and a high conversion gain mode when the dual conversion gain transistor is turned off (e.g., disabling the capacitor from contributing to the charge storage capacity of the floating diffusion region). For example, the source terminal of the dual conversion gain transistor may receive dual conversion gain control signals from the readout circuitry over the column lines.

The charge storage region may exhibit a first voltage level and the dual conversion gain transistor may be configured to turn on in response to the dual conversion gain control signal having a magnitude that is less than the first voltage level by a predetermined amount (e.g., such that the voltage difference between the gate terminal and source terminal are sufficiently large). The dual conversion gain transistor may be configured to turn off in response to the dual conversion gain control signal having a magnitude that is greater than the first voltage level minus the predetermined amount (e.g., such that the voltage difference between the gate terminal and source terminal are not sufficient to turn on the transistor). The image sensor pixel may include a charge transfer gate and a photosensitive region (e.g., photodiode) coupled between a ground terminal that receives a ground voltage level and the charge transfer gate, and the photosensitive region may be coupled to the charge storage region through the charge transfer gate. The pixel may include an additional terminal that receives a power supply voltage level and a reset transistor coupled between the charge storage region and the additional terminal. The dual conversion gain control signal may control the source terminal of the dual conversion gain transistor to turn the transistor on or off without using control signal magnitudes that are greater than the supply voltage level or less than the ground voltage level.

The readout control circuitry may provide the dual conversion gain control signal to the source terminal of the dual conversion gain transistor in a given image sensor pixel of a selected row of the array to control the image sensor pixel to exhibit a selected conversion gain (e.g., high or low conversion gain). The readout control circuitry may read out image signals from the floating diffusion region of the given image sensor pixel in the selected row of the array while the image sensor pixel exhibits the selected conversion gain. If desired, the control circuitry may provide an additional dual conversion gain control signal to the source terminal of the dual conversion gain transistor in an additional image sensor pixel of the selected row of the array to control the additional image sensor pixel to exhibit an additional selected conversion gain that is different from the selected conversion gain. The control circuitry may read out additional image signals from the floating diffusion region of the additional image sensor pixel while the additional image sensor pixel exhibits the additional selected conversion gain concurrently with reading out the image signals from the floating diffusion region of the given image sensor pixel while the image sensor pixel exhibits the selected conversion gain.

If desired, the control circuitry may determine whether to adjust the selected conversion gain based on the image signals read out from the floating diffusion region of the image sensor pixel, may control the image sensor pixel to exhibit an additional selected conversion gain that is different from the selected conversion gain in response to determining to adjust the selected conversion gain, and may read out additional image signals from the floating diffusion region of the image sensor pixel while the image sensor pixel exhibits the additional selected conversion gain. If desired, the array may include an additional image sensor pixel in the same column as the image pixel but in the subsequent adjacent row of the array. The control circuitry may determine an additional selected conversion gain for pixels in subsequent rows of the array based on image signals read out for pixels in previous rows of the array.

The image sensor pixel may be formed in a system having a central processing unit, memory, input-output circuitry, and an imaging device. The imaging device may include the array of image sensor pixels arranged in rows and columns. The array may include a first image sensor pixel located in a first column of a given row of the array and a second image sensor pixel located in a second column of the given row, for example. The first image sensor pixel may include a first dual conversion gain transistor having a first source terminal, whereas the second image sensor pixel includes a second dual conversion gain transistor having a second source terminal. While the row control circuitry continuously activates the given row of the array, the readout circuitry may read out first image signals from the first image sensor pixel while providing a first dual conversion gain control signal having a first magnitude to the first source terminal and the readout circuitry may read out second image signals from the second image sensor pixel while providing a second dual conversion gain control signal having a second magnitude that is different from the first magnitude to the second source terminal. In this way, the readout control circuitry may provide per-column (per-pixel) dual conversion gain for the pixels in each row the array without boosting the dual conversion gain signals to voltages greater than the supply voltage, thereby reducing voltage stress on the pixel array and improving lifetime of the image sensor.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor pixel, comprising:
   control circuitry;
   a charge storage region;
   a dual conversion gain transistor having a gate terminal coupled to the charge storage region, a source terminal coupled to the control circuitry, and a drain terminal; and
   a capacitor coupled between the drain terminal of the dual conversion gain transistor and the charge storage region.

2. The image sensor pixel defined in claim 1, wherein the dual conversion gain transistor is configured to place the image sensor pixel into a low conversion gain mode when the dual conversion gain transistor is turned on and wherein the dual conversion gain transistor is configured to place the image sensor pixel into a high conversion gain mode when the dual conversion gain transistor is turned off.

3. The image sensor pixel defined in claim 1, wherein the image sensor pixel is formed in an array of image sensor pixels arranged in rows and columns, wherein the control circuitry comprises column readout circuitry, wherein the columns of image sensor pixels in the array are coupled to the column readout circuitry via a plurality of conductive column lines, and wherein the source terminal of the dual conversion gain transistor is coupled to the column readout circuitry via a corresponding one of the plurality of conductive column lines.

4. The image sensor pixel defined in claim 3, wherein the dual conversion gain transistor is controlled by a dual conversion gain control signal received at the source terminal of the dual conversion gain transistor from the column readout circuitry.

5. The image sensor pixel defined in claim 4, wherein the charge storage region has a first voltage level and the dual conversion gain transistor is configured to turn on in response to the dual conversion gain control signal having a magnitude that is less than the first voltage level by a predetermined amount.

6. The image sensor pixel defined in claim 5, wherein the dual conversion gain transistor is configured to turn off in response to the dual conversion gain control signal having a magnitude that is greater than the first voltage level minus the predetermined amount.

7. The image sensor pixel defined in claim 1, further comprising:
a charge transfer gate; and
a photosensitive region coupled between a terminal that receives a ground voltage level and the charge transfer gate, wherein the photosensitive region is coupled to the charge storage region through the charge transfer gate.

8. The image sensor pixel defined in claim 7, further comprising:
an additional terminal that receives a power supply voltage level; and
a reset transistor coupled between the charge storage region and the additional terminal.

9. The image sensor pixel defined in claim 8, wherein the dual conversion gain transistor is configured to place the image sensor pixel in one of a high conversion gain mode and a low conversion gain mode based on a control signal received at the source terminal of the dual conversion gain transistor having a voltage magnitude that is greater than or equal to the ground voltage level and that is less than or equal to the power supply voltage level.

10. The image sensor pixel defined in claim 9, further comprising:
a column readout line, wherein the image sensor pixel is coupled to column control and readout circuitry via the column readout line; and
a source follower transistor coupled between the charge storage region and the column readout line.

11. A method of operating an imaging system having control circuitry and an array of image sensor pixels arranged in rows and columns, the method comprising:
with the control circuitry, providing a dual conversion gain control signal to a source terminal of a dual conversion gain transistor in an image sensor pixel of a selected row of the array to control the image sensor pixel to exhibit a selected conversion gain; and
with the control circuitry, reading out image signals from a floating diffusion region of the image sensor pixel in the selected row of the array while the image sensor pixel exhibits the selected conversion gain.

12. The method defined in claim 11, further comprising:
with the control circuitry, providing an additional dual conversion gain control signal to an additional source terminal of an additional dual conversion gain transistor in an additional image sensor pixel of the selected row of the array to control the additional image sensor pixel to exhibit an additional selected conversion gain that is different from the selected conversion gain; and
with the control circuitry, reading out additional image signals from an additional floating diffusion region of the additional image sensor pixel while the additional image sensor pixel exhibits the additional selected conversion gain concurrently with reading out the image signals from the floating diffusion region of the image sensor pixel while the image sensor pixel exhibits the selected conversion gain.

13. The method defined in claim 11, further comprising:
with the control circuitry, determining whether to adjust the selected conversion gain based on the image signals read out from the floating diffusion region of the image sensor pixel;
with the control circuitry, controlling the image sensor pixel to exhibit an additional selected conversion gain that is different from the selected conversion gain in response to determining to adjust the selected conversion gain; and
with the control circuitry, reading out additional image signals from the floating diffusion region of the image sensor pixel while the image sensor pixel exhibits the additional selected conversion gain.

14. The method defined in claim 11, wherein the floating diffusion region exhibits a first voltage level, the method further comprising:
with the control circuitry, placing the image sensor pixel in a low conversion gain mode by providing the dual conversion gain control signal at a second voltage level that is less than the first voltage level.

15. The method defined in claim 14, further comprising:
with the control circuitry, placing the image sensor pixel in a high conversion gain mode by providing the dual conversion gain control signal at a third voltage level that is greater than the second voltage level.

16. The method defined in claim 15, further comprising:
with the control circuitry, controlling a reset transistor in the image sensor pixel to reset the floating diffusion region in the image sensor pixel to a reset voltage level, wherein the third voltage level comprises the reset voltage level and the second voltage level comprises a ground voltage level.

17. The method defined in claim 11, wherein the image sensor pixel is formed in a first column and first row of the array and the array includes an additional image sensor pixel formed in the first column and a second row of the array, wherein the second row of the array is adjacent to the first row of the array, the method comprising:
with the control circuitry, determining an additional selected conversion gain for the additional image sensor pixel in the second row based on the image signals read out from the image sensor pixel in the first row;
with the control circuitry, controlling the additional image sensor pixel in the second row to exhibit the additional selected conversion gain; and
with the control circuitry, reading out additional image signals from the additional image sensor pixel in the second row while the additional image sensor pixel exhibits the additional selected conversion gain.

18. A system, comprising:
a central processing unit;
memory;
input-output circuitry; and
an imaging device, wherein the imaging device comprises:

an array of image sensor pixels arranged in rows and columns, wherein the array comprises a first image sensor pixel located in a first column of a given row of the array and a second image sensor pixel located in a second column of the given row, wherein the first image sensor pixel comprises a first dual conversion gain transistor having a first source terminal, and wherein the second image sensor pixel comprises a second dual conversion gain transistor having a second source terminal;

row control circuitry coupled to the given row of the array via a row control line; and readout circuitry coupled to the first column of the array via a first column line and coupled to the second column of the array via a second column line, wherein, while the row control circuitry continuously activates the given row of the array, the readout circuitry is configured to read out first image signals from the first image sensor pixel while providing a first control signal having a first magnitude to the first source terminal and the readout circuitry is configured to read out second image signals from the second image sensor pixel while providing a second control signal having a second magnitude that is different from the first magnitude to the second source terminal.

19. The system defined in claim 18, wherein the first image sensor pixel comprises a first floating diffusion node and a first capacitor, the first dual conversion gain transistor has a first gate terminal and a first drain terminal, the second image sensor pixel comprises a second floating diffusion node and a second capacitor, the second dual conversion gain transistor has a second gate terminal and a second drain terminal, the first gate terminal is coupled to the first floating diffusion node, the first drain terminal is coupled to the floating diffusion node through the first capacitor, the second gate terminal is coupled to the second floating diffusion node, and the second drain terminal is coupled to the second floating diffusion node through the second capacitor.

20. The system defined in claim 18, wherein the first image sensor pixel comprises a first photodiode coupled to a first terminal supplied with a ground voltage level, the second image sensor pixel comprises a second photodiode coupled to a second terminal supplied with the ground voltage level, the first image sensor pixel has a third terminal supplied with a reset voltage level, the second image sensor pixel has a fourth terminal supplied with the reset voltage level, the first magnitude is approximately equal to the ground voltage level, and the second magnitude is approximately equal to the reset voltage level.

* * * * *